US006530537B2

(12) United States Patent
Hanlon

(10) Patent No.: US 6,530,537 B2
(45) Date of Patent: Mar. 11, 2003

(54) MOVABLE ELECTRIC MACHINERY HAVING A TRAILING CABLE EXTENDING THROUGH A HINGED SHEAVE BRACKET ASSEMBLY

(75) Inventor: Ronald D. Hanlon, Stoneboro, PA (US)

(73) Assignee: Joy MM Delaware, Inc., Wilmington, DE (US)

(*) Notice: Subject to any disclaimer, the term of this patent is extended or adjusted under 35 U.S.C. 154(b) by 68 days.

(21) Appl. No.: 09/681,165

(22) Filed: Feb. 7, 2001

(65) Prior Publication Data

US 2002/0104915 A1 Aug. 8, 2002

(51) Int. Cl.⁷ .............................................. B65H 75/48
(52) U.S. Cl. .................................................. 242/390.8
(58) Field of Search ....................... 191/12.2 R, 12.2 A, 191/71, 80, 81; 242/390.8, 390.9, 379, 397, 397.5, 398, 403, 615.1, 615.2, 615.3, 157 R

(56) References Cited

U.S. PATENT DOCUMENTS

| | | | | |
|---|---|---|---|---|
| 2,458,573 A | * | 1/1949 | Donahue | 254/190 |
| 3,061,233 A | * | 10/1962 | Dudley | 242/86.51 |
| 4,047,599 A | * | 9/1977 | Rousseau | 191/12.2 A |
| 4,569,489 A | * | 2/1986 | Frey et al. | 242/86.51 |
| 4,583,700 A | * | 4/1986 | Tschrubanoff | 242/86.51 |
| 4,982,057 A | * | 1/1991 | Bartkoski | 191/12 R |
| 6,119,837 A | * | 9/2000 | Tschrubanoff et al. | 191/12.2 A |

FOREIGN PATENT DOCUMENTS

JP 6-47439 A * 2/1994 ........... B21C/47/24

* cited by examiner

Primary Examiner—Donald P. Walsh
Assistant Examiner—Mark J. Beauchaine
(74) Attorney, Agent, or Firm—James Earl Lowe, Jr.

(57) ABSTRACT

A movable machine including a frame having an end, an electrical motor on the frame, a cable electrically connected to the motor and adapted to be connected to a source of power, and a sheave bracket assembly mounted on the frame end. The sheave bracket assembly includes a mounting plate, two spaced apart sheaves rotatably mounted on the mounting plate, the cable extending between the sheaves, and hinged arms connecting the mounting plate to the frame end for permitting pivotal movement of the mounting plate relative to the frame.

38 Claims, 4 Drawing Sheets

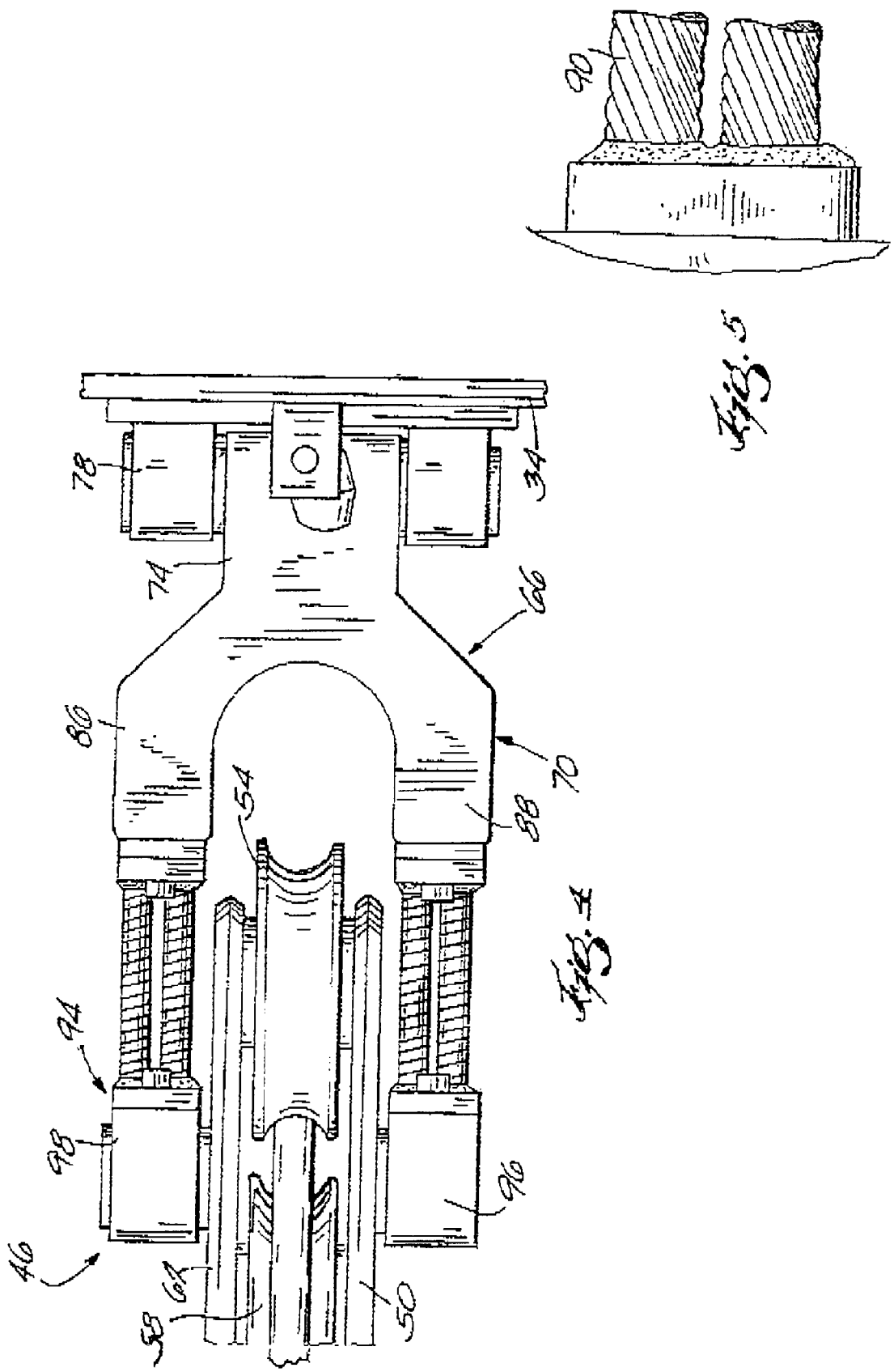

MOVABLE ELECTRIC MACHINERY HAVING A TRAILING CABLE EXTENDING THROUGH A HINGED SHEAVE BRACKET ASSEMBLY

BACKGROUND OF THE INVENTION

This invention relates to movable electric machinery having a trailing cable connected to a source of power. More particularly, this invention relates to a mechanism for preventing the cable from contacting the movable electrical machinery as the machinery moves forward, backwards, and around corners.

Movable electrical machinery, such as shuttle cars used for carrying mining material in underground mines, have electric motors connected by a cable to a source of power. As the machinery moves backwards, forwards, and around corners, the cable is either wound onto or paid out of a reel. The cable extends from the rear of the shuttle car, and, at times, either runs along the side of the shuttle car, when the shuttle car is moving backwards, or extends straight back from the shuttle car, when the shuttle car is moving forward. When the shuttle car moves around right corners, the cable runs along the rear of the shuttle car.

In order to prevent the cable contacting the side or the rear of the shuttle car, a two-sheave bracket assembly has been fixed on the left rear of the shuttle car. One sheave extends just beyond the rear most part of the shuttle car on one side of the shuttle car, and the second sheave, spaced from the first sheave, extends outward from the side of the shuttle car. In this manner, the cable either extends around one sheave and across the rear of the shuttle car when the shuttle car is making a 90-degree right turn, or the cable extends around the other sheave and back along the side of the shuttle car when the shuttle car is moving backwards. The current sheave bracket assembly arrangement is limited as to how far it can stick out of the side of the machine, otherwise the bracket assembly could be damaged by the bracket contacting the wall of the mine. Furthermore, the sheave bracket assembly cannot extend too much rearward of the shuttle car or it will affect the turning radius of the machine.

SUMMARY OF THE INVENTION

The invention provides a movable machine including a frame having an end, an electrical motor on the frame, a cable electrically connected to the motor and adapted to be connected to a source of power, and a sheave bracket assembly mounted on the frame end. The sheave bracket assembly includes a mounting plate, two spaced apart sheaves rotatably mounted on the mounting plate, the cable extending between the sheaves, and hinged means connecting the mounting plate to the frame end for permitting pivotal movement of the mounting plate relative to said frame.

More particularly, the invention provides a movable machine including a frame, an electrical motor on the frame, a cable electrically connected to the motor and adapted to be connected to a source of power, a reel on the frame between the electric motor and one end of the frame, the reel providing storage of the cable, a spooling device between the reel and the one frame end, and a sheave bracket assembly mounted on the one frame end. The sheave bracket assembly includes a mounting plate, and two spaced apart sheaves rotatably mounted on the mounting plate. The cable extends between the sheaves. A second mounting plate is parallel to and spaced apart from the first mounting plate, and the two spaced apart sheaves are also rotatably mounted on the second mounting plate.

The sheave bracket assembly also includes hinged means connecting the mounting plates to the frame end for permitting pivotal movement of the mounting plates relative to the frame. The hinged means comprises an arm including a first Y-shaped part with its base attached to a first pivot mount connecting its base to the frame end, and each upper Y piece includes four wire ropes attached thereto and attached to a second pivot mount connecting the four wire ropes to the mounting plate. The second pivot mount includes a lower pivot connection to the first mounting plate and to one of the upper Y pieces, and an upper pivot connection to the second mounting plate and to the other of the upper Y pieces.

The hinged means also includes a second arm including a first Y-shaped part with its base attached to another first pivot mount connecting its base to the frame end. Each upper Y piece includes four wire ropes attached thereto and attached to another second pivot mount connecting the four wire ropes to the mounting plate. This other second pivot mount includes a lower pivot connection to the first mounting plate and to one of the second arm upper Y pieces, and an upper pivot connection to the second mounting plate and to the other of the second arm upper Y pieces.

Still more particularly, the movable machine further includes a first resilient stop attached to the frame end adjacent the first pivot mount and a second resilient stop attached to the frame end adjacent the other side of the first pivot mount.

One of the principal objects of the invention is to provide a hinged sheave bracket assembly. A hinged sheave bracket assembly permits further extension of the sheave bracket assembly to the side of the shuttle car.

Another of the principal objects of the invention is to provide a hinged sheave bracket assembly mounted on flexible arms. The flexible arms reduce the stress put on the cable as the machine moves and changes direction. Further, if the sheave bracket assembly should engage the mine wall, the flexible arms help reduce the likelihood of damage to the sheave bracket assembly.

BRIEF DESCRIPTION OF DRAWINGS

FIG. 4 is a partial end view of the hinged sheave bracket assembly taken along the line 4—4 in FIG. 2.

FIG. 5 is a partial side view of an arm including wire ropes welded to a pivot mount.

Figure 1:
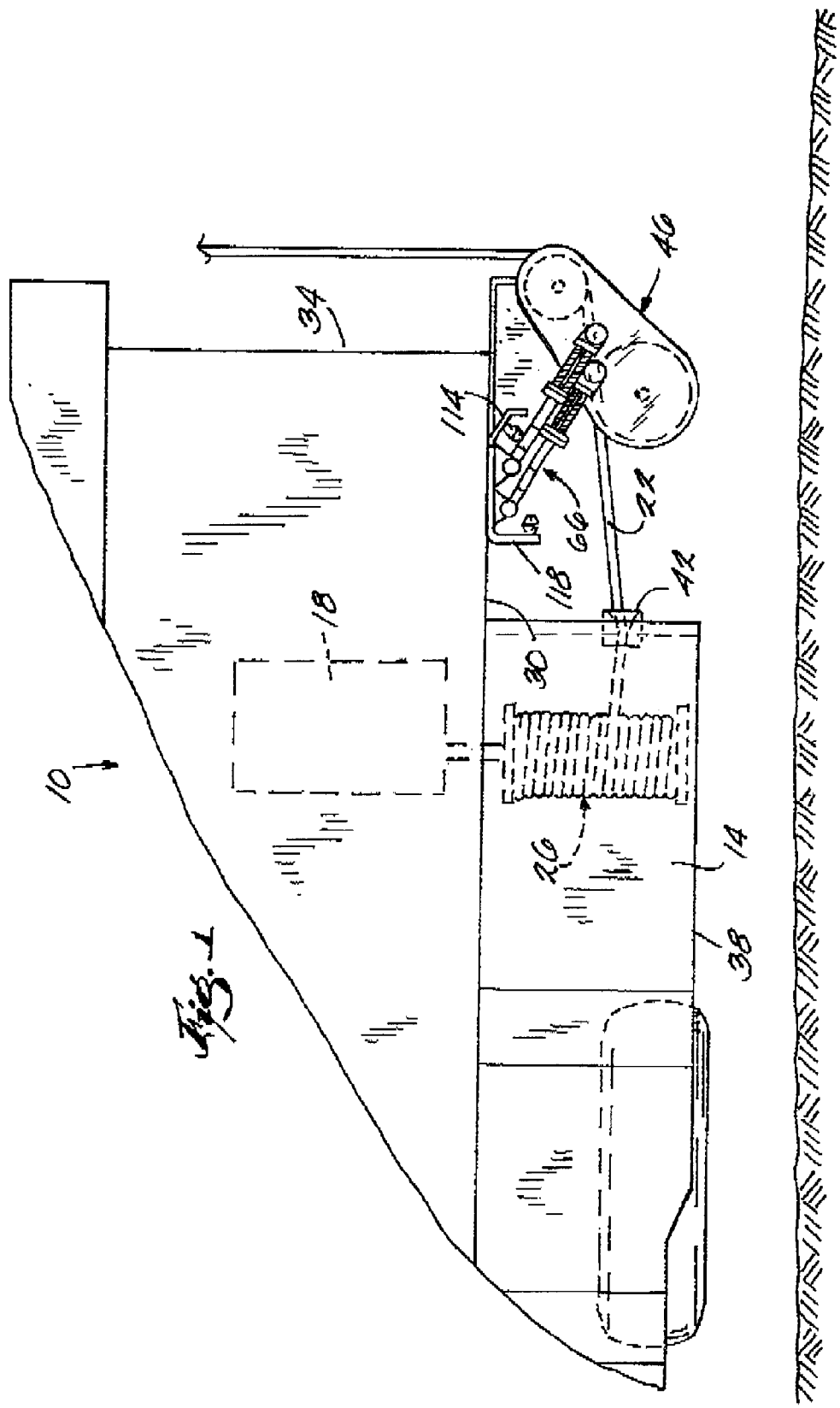
FIG. 1 is a partial top view of the left rear corner of a shuttle car embodying various features of the invention. Illustrated schematically in ghost is a motor, a cable, a cable reel, and the cable extending through a spooling device and then in between the sheaves of a hinged sheave bracket assembly. The cable then extends across the rear of the shuttle car when, for example, the shuttle car has made a right turn.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof The use of "consisting of" and variations thereof herein is meant to encompass only the items listed thereafter and the equivalents thereof.

DETAILED DESCRIPTION

Figure 2:
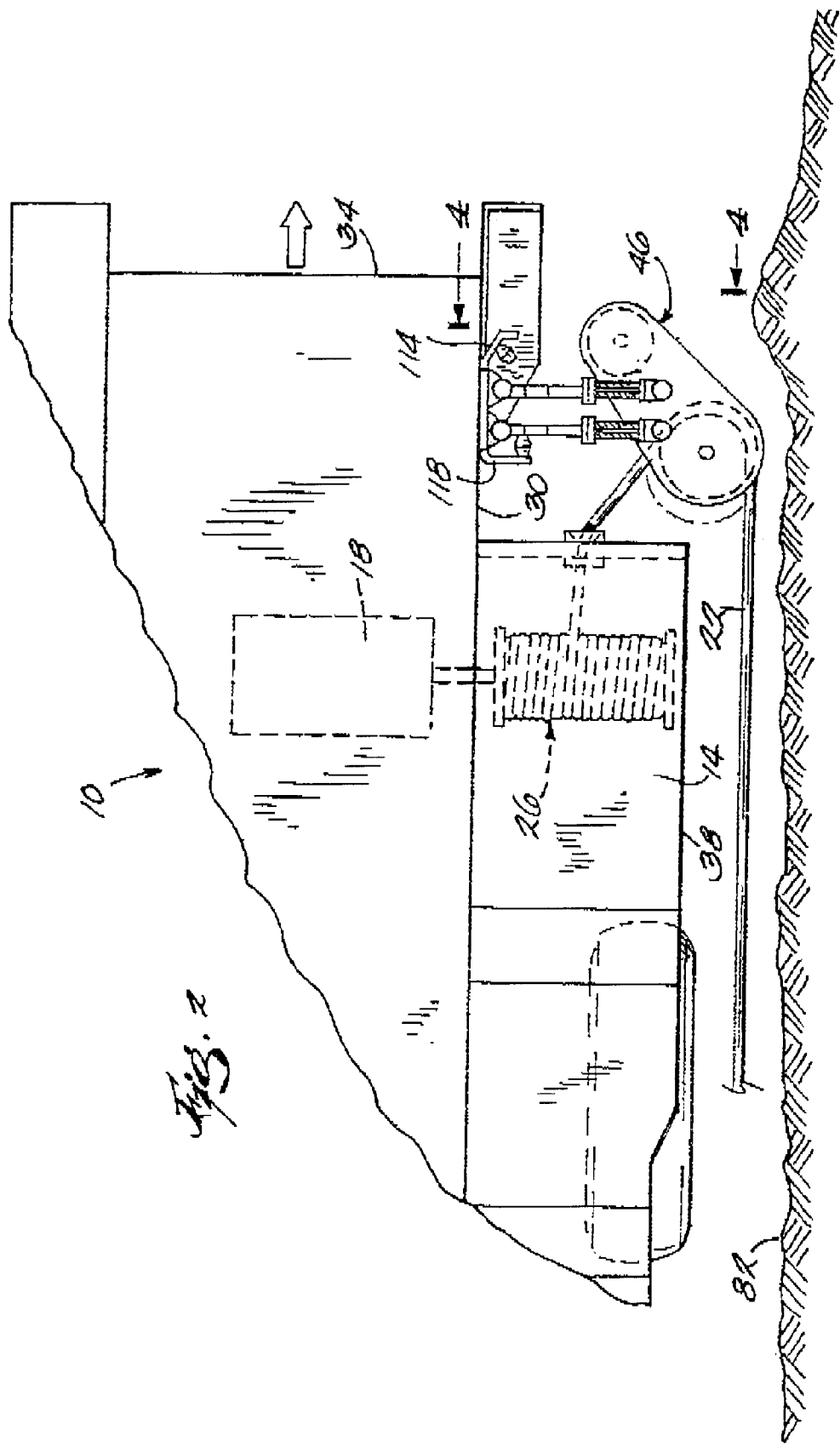
FIG. 2 is a view similar to FIG. 1 only showing the location of the hinged flexible bracket assembly and the cable as the shuttle car moves in a rearward direction.

As illustrated in the drawings, this invention comprises a movable machine. More particularly, a shuttle car 10 useful in hauling material in underground mines is shown in FIG. 1. The shuttle car includes a frame 14, an electrical motor 18 on the frame 14, and a cable 22,electrically connected to the motor 18 and adapted to be connected to a source of power (not shown). The shuttle car 10 further includes a reel 26 on the frame 14 between the electric motor 18 and one end of the frame 14. More specifically, the reel 26 is located near the left rear 30 of the shuttle car 10 and the reel 26 provides for storage of the cable 22. More particularly, as the shuttle car 10 moves backwards, forwards, and around corners, the cable 22 is either wound onto or paid out of a reel 26. The cable 22 extends from the rear 34 of the shuttle car 10, and, at times, as shown in FIG. 2, either runs along the side 38 of the shuttle car 10, when the shuttle car 10 is moving backwards, or extends straight back from the shuttle car 10, when the shuttle car 10 is moving forward (not shown). When the shuttle car moves right around a corner, as shown in FIG. 1, the cable 22 runs along the rear 34 of the shuttle car 10. In many applications, the cable 22 can be between 500 and 750 feet long.

Figure 3:
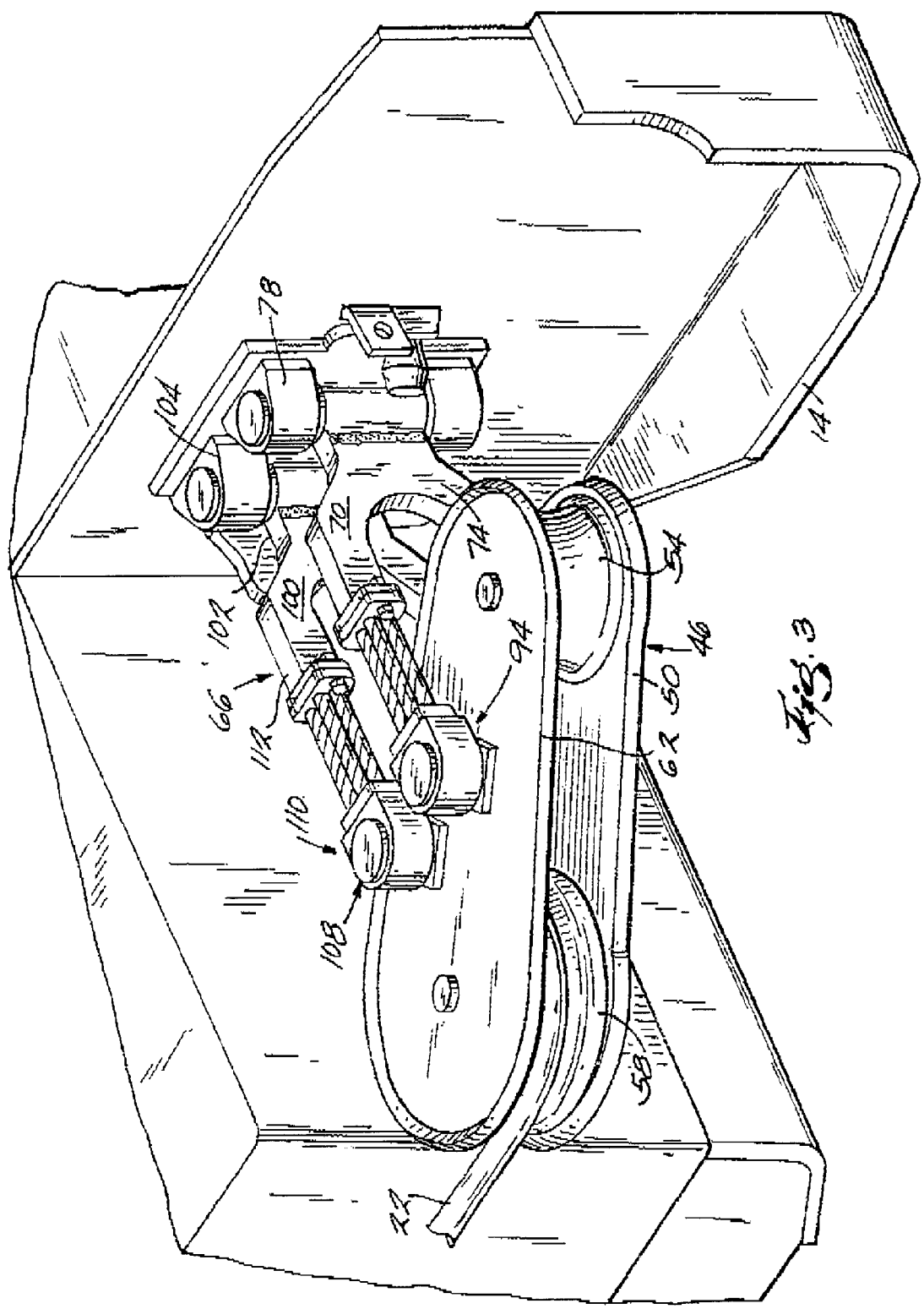
FIG. 3 is a partial perspective view of the flexible sheave bracket assembly shown in FIG. 2.

The shuttle car 10 further includes a spooling device 42 between the reel 26 and the rear 34 of the shuttle car 10, and a sheave bracket assembly 46 mounted on the left rear 30 of the shuttle car 10. As shown in FIGS. 3 and 4, the sheave bracket assembly 46 includes a lower mounting plate 50, and two spaced apart sheaves 54 and 58 rotatably mounted on the lower mounting plate 50. As shown in FIGS. 1 and 2, the cable 22 extends from the cable reel 26 through the spooling device 42, and then between the sheaves 54 and 58.

As shown in FIGS. 3 and 4, the sheave bracket assembly 46 further includes a second mounting plate 62 parallel to and spaced apart from the first mounting plate 50. The two spaced apart sheaves 54 and 58 are also rotatably mounted on the second mounting plate 62 between the two mounting plates 50 and 62.

In order to permit the sheave bracket assembly 46 to be small in size, but still prevent the cable 22 from contacting either the rear 34 of the shuttle car 10 or the side 38 of the shuttle car 10, the sheave bracket assembly 46 further includes a hinged means 66 connecting the mounting plates 50 and 62 to the rear end 34 of the shuttle car 10 for permitting pivotal movement of the mounting plates relative to the frame 14. More particularly, the hinged means 66 comprises an arm 70 having two ends, the arm including a first Y-shaped part with its base 74 attached to a first pivot mount 78 connecting the base to the rear end 34 of the shuttle car 10.

In order to give the hinged means 66 some flexibility to help prevent damage to the sheave bracket assembly 46 in the event of the assembly contacting a mine wall 82 (see FIG. 2), and to help absorb shocks to the assembly 46 occasioned by changes in direction of the cable 22, each upper Y piece 86 or 88 includes four wire ropes 90 attached thereto by welding. The other end of the wire ropes 90 are attached by welding (as shown in FIG. 5) to a second pivot mount 94 (see FIG. 4) connecting the wire ropes to the upper 62 and lower 50 mounting plates. More particularly, the second pivot mount 94 includes a lower pivot connection 96 to the first or lower mounting plate 50 and to one of the upper Y pieces 88, and an upper pivot connection 98 to the second mounting plate 62 and to the other of the upper Y pieces 86.

The hinged means 66 further includes a second arm 100 (see FIG. 3) having two ends, the second arm also including a first Y-shaped part with its base 102 attached to another first pivot mount 104 connecting the base 102 to the rear end 34 of the shuttle car 10 and each upper Y piece (only one shown) including four wire ropes attached thereto and attached to another second pivot mount 108 connecting the wire ropes to the upper and lower mounting plates 50 and 62. More particularly, the other second pivot mount 108 also includes a lower pivot connection (not shown) to the first mounting plate 50 and to the lower one of the second arm upper Y pieces, and an upper pivot connection 110 to the second mounting plate 62 and to the upper one 112 of the second arm upper Y pieces.

More particularly, the frame left rear end is notched. The notch is formed by a first exterior wall and a second exterior wall extending perpendicular to the first exterior wall. The first arm 70 and a second arm 100 are connected to the first wall, and the sheave bracket is located substantially within the notch.

As shown in FIG. 1, in order to reduce the likelihood of contact between the arms 70 and 100 and the shuttle car 10 causing damage to the arms 70 and 100, the sheave bracket assembly 46 further includes a first resilient stop 114 attached to the rear end 34 of the shuttle car 10 adjacent the first pivot mount 78, and a second resilient stop 118 attached to the rear end 34 of the shuttle car 10 adjacent the other side of the other first pivot mount 104.

Since the rearward most sheave 54 only needs to support the cable 22 through less than 90 degrees, while the other sheave 58 needs to support the cable through more than 90 degrees, the rearward most sheave 54 has a smaller diameter than the other sheave 58.

Several of the other features of the invention are set forth in the following.

What is claimed is:

1. A movable machine including:
   a frame having an end, said frame end having a first exterior wall,
   an electrical motor on said frame,
   a cable electrically connected to said motor and adapted to be connected to a source of power,
   a sheave bracket assembly mounted on said frame end, said sheave bracket assembly including:
      a mounting plate,
      two spaced apart sheaves rotatably mounted on said mounting plate, said cable extending between said sheaves, and
      hinged means connecting said mounting plate to said frame end first exterior wall for permitting pivotal movement of said mounting plate relative to said frame.

2. A movable machine in accordance with claim 1 and further including a reel on said frame between said electric motor and said end of said frame, said reel providing storage of said cable, and a spooling device between said reel and said frame end.

3. A movable machine in accordance with claim 1 wherein said hinged means comprises:
- an arm having two ends,
- a first pivot mount connecting one arm end to said frame end, and
- a second pivot mount connecting the other arm end to said mounting plate.

4. A movable machine in accordance with claim 3 wherein said sheave bracket assembly further includes a second mounting plate parallel to and spaced apart from said first mounting plate, said two spaced apart sheaves also being rotatably mounted on said second mounting plate, and wherein said second pivot mount includes a lower pivot connection to said first mounting plate, and an upper pivot connection to said second mounting plate.

5. A movable machine in accordance with claim 4 wherein said arm includes a first Y-shaped part, said Y-shaped part having a base and two upper Y-shaped pieces, with said base attached to the first pivot mount, and each upper Y piece including a wire rope attached thereto, and attached to a respective one of the second pivot mount upper and lower pivot connections.

6. A movable machine in accordance with claim 5 wherein each upper Y piece includes four wire ropes attached thereto and attached to the respective one of the second pivot mount connections.

7. A movable machine in accordance with claim 3 wherein said hinged means further includes:
- a second arm spaced from said first arm and having two ends, another first pivot mount connecting said second arm one end to said frame end, and another second pivot mount connecting the other second arm end to said mounting plate.

8. A movable machine in accordance with claim 7 wherein said sheave bracket assembly further includes a second mounting plate parallel to and spaced apart from said first mounting plate, said two spaced apart sheaves also being rotatably mounted on said second mounting plate, and wherein each of said second pivot mounts includes a lower pivot connection to said first mounting plate, and an upper pivot connection to said second mounting plate.

9. A movable machine in accordance with claim 8 wherein said second arm includes a first Y-shaped part, said Y-shaped part having a base and two upper Y-shaped pieces, with said base attached to the first pivot mount, and each upper Y piece including a wire rope attached thereto and attached to a respective one of the second pivot mount upper and lower pivot connections.

10. A movable machine in accordance with claim 9 wherein each upper Y piece includes four wire ropes attached thereto and attached to the respective one of the second pivot mounts.

11. A movable machine in accordance with claim 1 and further including a first resilient stop attached to the frame end adjacent the first pivot mount and a second resilient stop attached to the frame end adjacent the other side of the first pivot mount.

12. A movable machine in accordance with claim 1 and wherein one of said sheaves has a smaller diameter than the other sheave.

13. A movable machine in accordance with claim 1 wherein said frame end has a notched corner, said notch being formed between said first exterior wall and a second exterior wall extending perpendicular to said first exterior wall, said sheave bracket being located substantially within said notch.

14. A movable machine in accordance with claim 1 wherein said hinged means has a length about the same as the distance between the spaced apart sheaves.

15. A movable machine including:
- a frame,
- an electrical motor on said frame,
- a cable electrically connected to said motor and adapted to be connected to a source of power,
- a reel on said frame between said electric motor and one end of said frame, said reel providing storage of said cable,
- a spooling device between said reel and said one frame end,
- a sheave bracket assembly mounted on said one frame end, said sheave bracket assembly including:
  - a mounting plate,
  - two spaced apart sheaves rotatably mounted on said mounting plate, said cable extending between said sheaves, a second mounting plate parallel to and spaced apart from said first mounting plate, said two spaced apart sheaves also being rotatably mounted on said second mounting plate, and hinged means connecting said mounting plates to said frame end for permitting pivotal movement of said mounting plates relative to said frame, said hinged means comprising:
    - an arm including a first Y-shaped part, said Y-shaped part having a base and two upper Y-shaped pieces, with said base attached to a first pivot mount connecting its base to said frame end, and each upper Y piece including four wire ropes attached thereto and attached to a second pivot mount connecting the four wire ropes to said mounting plates, said second pivot mount including a lower pivot connection to said first mounting plate and to one of said upper Y pieces, and an upper pivot connection to said second mounting plate and to the other of said upper Y pieces,
    - a second arm also including a first Y-shaped part, said Y-shaped part having a base and two upper Y-shaped pieces, with said base attached to another first pivot mount connecting its base to said frame end, and each upper Y piece including four wire ropes attached thereto and attached to another second pivot mount connecting the four wire ropes to said mounting plates, said another second pivot mount including a lower pivot connection to said first mounting plate and to one of said second arm upper Y pieces, and an upper pivot connection to said second mounting plate and to the other of said second arm upper Y pieces.

16. A movable machine in accordance with claim 15 and further including a first resilient stop attached to the frame end adjacent the first pivot mount and a second resilient stop attached to the frame end adjacent the other side of the first pivot mount.

17. A movable machine in accordance with claim 15 and wherein one of said sheaves has a smaller diameter than the other sheave.

18. A movable machine including:
- a frame having an end,
- an electrical motor on said frame,
- a cable electrically connected to said motor and adapted to be connected to a source of power,
- a sheave bracket assembly mounted on said frame end, said sheave bracket assembly including:

a mounting plate, two spaced apart sheaves rotatably mounted on said mounting plate, said cable extending between said sheaves, and hinged means connecting said mounting plate to said frame end for permitting pivotal movement of said mounting plate relative to said frame, said hinged means including an arm having two ends, a first pivot mount connecting one arm end to said frame end, and a second pivot mount connecting the other arm end to said mounting plate, and a second arm spaced from said first arm and having two ends, another first pivot mount connecting said second arm one end to said frame end, and another second pivot mount connecting the other second arm end to said mounting plate.

19. A movable machine in accordance with claim 18 and further including a reel on said frame between said electric motor and said end of said frame, said reel providing storage of said cable, and a spooling device between said reel and said frame end.

20. A movable machine in accordance with claim 18 wherein said sheave bracket assembly further includes a second mounting plate parallel to and spaced apart from said first mounting plate, said two spaced apart sheaves also being rotatably mounted on said second mounting plate, and wherein said second pivot mount includes a lower pivot connection to said first mounting plate, and an upper pivot connection to said second mounting plate.

21. A movable machine in accordance with claim 20 wherein said arm includes a first Y-shaped part, said Y-shaped part having a base and two upper Y-shaped pieces, with said base attached to the first pivot mount, and each upper Y piece including a wire rope attached thereto, and attached to a respective one of the second pivot mount upper and lower pivot connections.

22. A movable machine in accordance with claim 21 wherein each upper Y piece includes four wire ropes attached thereto and attached to the respective one of the second pivot mount connections.

23. A movable machine in accordance with claim 22 wherein said sheave bracket assembly further includes a second mounting plate parallel to and spaced apart from said first mounting plate, said two spaced apart sheaves also being rotatably mounted on said second mounting plate, and wherein each of said second pivot mounts includes a lower pivot connection to said first mounting plate, and an upper pivot connection to said second mounting plate.

24. A movable machine in accordance with claim 23 wherein said second arm includes a first Y-shaped part, said Y-shaped part having a base and two upper Y-shaped pieces, with said base attached to the first pivot mount, and each upper Y piece including a wire rope attached thereto and attached to a respective one of the second pivot mount upper and lower pivot connections.

25. A movable machine in accordance with claim 24 wherein each upper Y piece includes four wire ropes attached thereto and attached to the respective one of the second pivot mounts.

26. A movable machine in accordance with claim 18 and further including a first resilient stop attached to the frame end adjacent the first pivot mount and a second resilient stop attached to the frame end adjacent the other side of the first pivot mount.

27. A movable machine in accordance with claim 18 and wherein one of said sheaves has a smaller diameter than the other sheave.

28. A movable machine including:

a frame having an end, an electrical motor on said frame, a cable electrically connected to said motor and adapted to be connected to a source of power, a sheave bracket assembly mounted on said frame end, said sheave bracket assembly including:

a mounting plate, two spaced apart sheaves rotatably mounted on said mounting plate, one of said sheaves having a smaller diameter than the other sheave, and said cable extends between said sheaves, and hinged means connecting said mounting plate to said frame end for permitting pivotal movement of said mounting plate relative to said frame.

29. A movable machine in accordance with claim 28 and further including a reel on said frame between said electric motor and said end of said frame, said reel providing storage of said cable, and a spooling device between said reel and said frame end.

30. A movable machine in accordance with claim 28 wherein said hinged means comprises:

an arm having two ends, a first pivot mount connecting one arm end to said frame end, and a second pivot mount connecting the other arm end to said mounting plate.

31. A movable machine in accordance with claim 30 wherein said sheave bracket assembly further includes a second mounting plate parallel to and spaced apart from said first mounting plate, said two spaced apart sheaves also being rotatably mounted on said second mounting plater and wherein said second pivot mount includes a lower pivot connection to said first mounting plate, and an upper pivot connection to said second mounting plate.

32. A movable machine in accordance with claim 31 wherein said arm includes a first Y-shaped part, said Y-shaped part having a base and two upper Y-shaped pieces, with said base attached to the first pivot mount, and each upper Y piece including a wire rope attached thereto, and attached to a respective one of the second pivot mount upper and lower pivot connections.

33. A movable machine in accordance with claim 32 wherein each upper Y piece includes four wire ropes attached thereto and attached to the respective one of the second pivot mount connections.

34. A movable machine in accordance with claim 30 wherein said hinged means further includes:

a second arm spaced from said first arm and having two ends, another first pivot mount connecting said second arm one end to said frame end, and another second pivot mount connecting the other second arm end to said mounting plate.

35. A movable machine in accordance with claim 34 wherein said sheave bracket assembly further includes a second mounting plate parallel to and spaced apart from said first mounting plate, said two spaced apart sheaves also being rotatably mounted on said second mounting plate, and wherein each of said second pivot mounts includes a lower pivot connection to said first mounting plate, and an upper pivot connection to said second mounting plate.

36. A movable machine in accordance with claim 35 wherein said second arm includes a first Y-shaped part, said Y-shaped part having a base and two upper Y-shaped pieces, with said base attached to the first pivot mount, and each upper Y piece including a wire rope attached thereto and attached to a respective one of the second pivot mount upper and lower pivot connections.

37. A movable machine in accordance with claim 36 wherein each upper Y piece includes four wire ropes attached thereto and attached to the respective one of the second pivot mounts.

38. A movable machine in accordance with claim 28 and further including a first resilient stop attached to the frame end adjacent the first pivot mount and a second resilient stop attached to the frame end adjacent the other side of the first pivot mount.

* * * * *